UNITED STATES PATENT OFFICE.

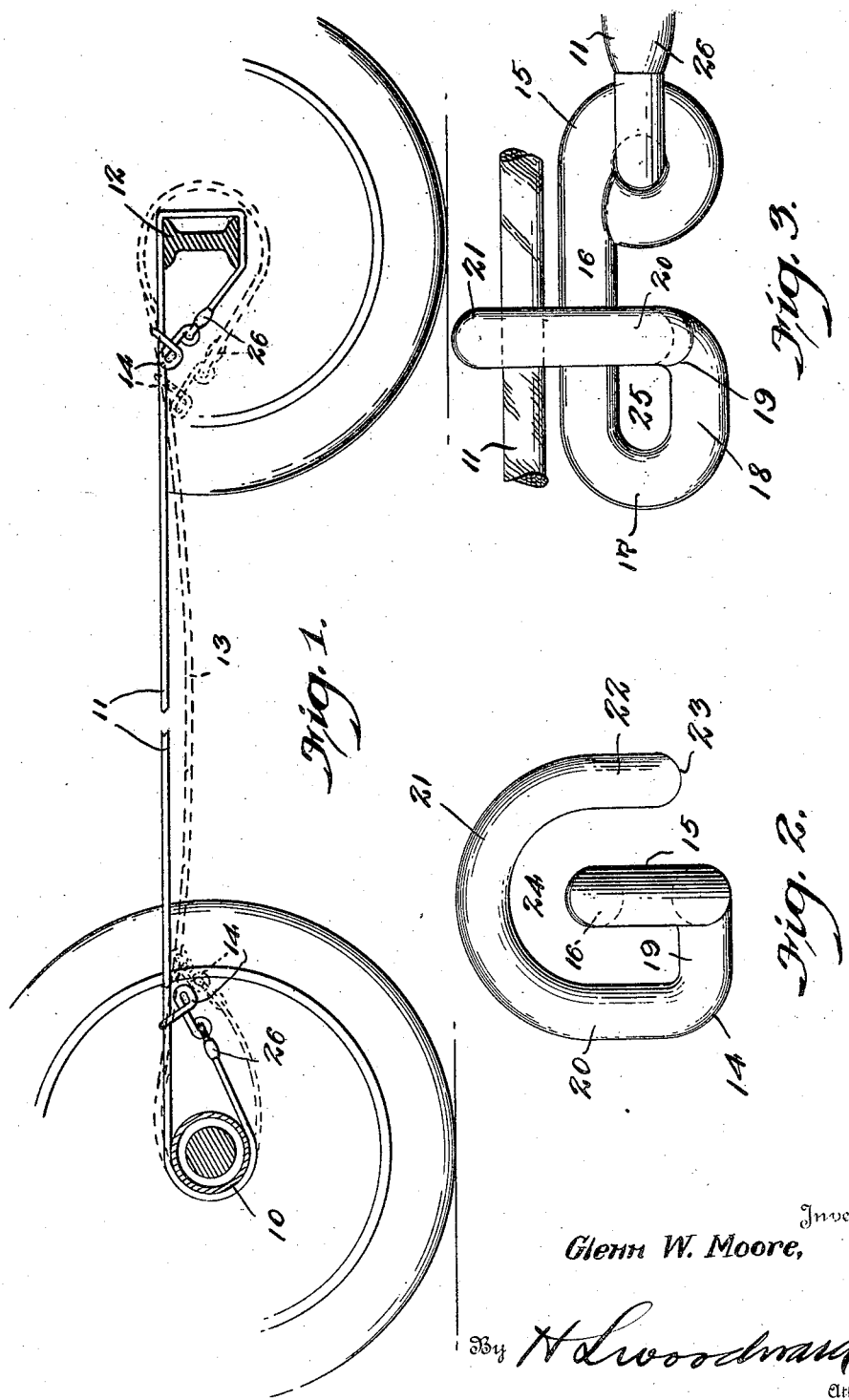

GLENN W. MOORE, OF UPPER ALTON, ILLINOIS.

TOWLINE AND FASTENER.

1,418,958. Specification of Letters Patent. Patented June 6, 1922.

Application filed October 11, 1921. Serial No. 506,996.

*To all whom it may concern:*

Be it known that I, GLENN W. MOORE, a citizen of the United States, residing at Upper Alton, in the county of Madison and State of Illinois, have invented certain new and useful Improvements in Towlines and Fasteners, of which the following is a specification.

The invention has for an object to effect improvements in devices especially adapted to use in anchoring, and especially in towlines for motor vehicles, having the principle object of the invention to provide a towing device in which there will be a minimum liability of slack being run over by a towed vehicle, while a further very important feature of the invention is to provide a fastener for the line which may be engaged without the formation of convolutions in the cable for its fastening, but will only require the laying of a straight strand cable in the device. It is also an aim to obviate the need for any movable latch or other means to hold the towing cable secured in the fastening element.

Additional objects, advantages and features of invention may appear from the structure, or relation of the parts as may be understood from the following description and drawings, wherein, Figure 1 is an elevational view of the device applied to the axles of a towing and towed motor vehicle, Fig. 2 is a detail end elevational view of the fastener element, Fig. 3 is a side view thereof.

There is illustrated in Fig. 1, an axle 10 of a machine, connected by a towline 11 with the front axle 12 of a motor vehicle being towed. The slack in the towline is dotted at 13.

For the securement of the line 11 as illustrated, there is provided a fastener element 14, which is formed of bar steel circular in cross section with adequate dimensions for the uses intended. A portion of proper stock being selected, one extremity is bent and preferably welded to form a plain eye 15, with a shank 16 extending at a tangent therefrom. At a suitable distance outwardly from the eye, the shank 16 is bent in the same plane with the eye 15, in the same direction and on a similar curve until a recurved portion 17 is bent parallel to the shank, as at 18, this being a return part and extended for a short distance. At a point intermediately of the length of the shank 16, the stock is bent outwardly as at 19 at right angles to the plane of the eye 15 and the curved part 17, being then extended upwardly a short distance at right angles to the part 19, as at 20, in Fig. 2, and when in a line with the axis of the shank 16 parallel to the part 19, a saddle 21 concentric with the shank 16 is formed, by bending the outer part of the stock over the shank at a constant distance therefrom, the outer end extending a short distance parallel to the part 20 as at 22 in Fig. 2, where it stops short and is finished with a rounded end, as at 23. The saddle element is formed in a plane at right angles to the shank 16, as may be understood, and thus provides a U-shaped slot 24 therewithin from which a forward extension 25 is formed by the recurved part 18, as first described.

In use, as a towline, the line being selected of proper length, one of my fasteners 14 is engaged with each end of the line, by extending one end of the line through the eye 15, bending it back and wrapping it in a customary manner, or otherwise securing the end inserted through the eye; in the present instance, the ends having been spliced, and a covering of lead applied thereto, as at 26, in Fig. 3. When the device is to be used, one end is laid over the axle of the vehicle which is to do the towing, and the saddle portion 21 engaged over the intermediate part of the line, as shown in Fig. 1, while similar engagement at the opposite end of the line 11 is made with the front axle of the vehicle to be towed. In this way, when strain is put upon the towline, it cannot become drawn so tightly engaged that the fastener device cannot be disengaged, but on the contrary, it is at all times so loosely engaged with the cable that when slack is permitted in the line, the natural elasticity of the cable will cause the fastening device to slip inwardly upon the cable a distance. and this will be marked in wire cables, where the movement will be considerable, even sufficient at times to prevent slack in the line from falling to the roadway and becoming caught in the towed machine.

What is claimed is:—

A fastener for the purposes described comprising a body having a terminal eye therein, a shank extending a distance, a recurved part at the outer part of the shank, and a transverse saddle portion formed on the extremity of the recurved part in a plane at right angles to the line of the shank, and concentric with the shank.

In testimony whereof I have affixed my signature in presence of two witnesses.

GLENN W. MOORE.

Witnesses:
CHAS. W. WIGHTMAN,
HARRY NEVLIN.